United States Patent
Kugler et al.

(10) Patent No.: US 9,790,690 B2
(45) Date of Patent: Oct. 17, 2017

(54) PERIPHERAL STABILIZING SYSTEM FOR ELEVATED FLOORING SURFACE

(71) Applicant: United Construction Products, Inc., Denver, CO (US)

(72) Inventors: William E. Kugler, Denver, CO (US); Stephen J. Knight, III, Littleton, CO (US); Lisa K. von-Gunten, Denver, CO (US)

(73) Assignee: United Construction Products, Inc., Denver, CO (US)

( * ) Notice: Subject to any disclaimer, the term of this patent is extended or adjusted under 35 U.S.C. 154(b) by 0 days.

(21) Appl. No.: 15/068,318

(22) Filed: Mar. 11, 2016

(65) Prior Publication Data

US 2017/0260753 A1    Sep. 14, 2017

(51) Int. Cl.
    *E04F 15/024*    (2006.01)
(52) U.S. Cl.
    CPC .... *E04F 15/0247* (2013.01); *E04F 15/02452* (2013.01); *E04F 15/02458* (2013.01); *E04F 15/02494* (2013.01)
(58) Field of Classification Search
    CPC ......... E04F 15/02027; E04F 2201/0511; E04F 19/022; E04F 19/04; E04F 2019/0413; E04F 19/06; E04F 19/061; E04F 19/067
    See application file for complete search history.

(56) References Cited

U.S. PATENT DOCUMENTS

| | | | |
|---|---|---|---|
| 2,703,002 A | 3/1955 | Suskind | |
| 3,045,294 A * | 7/1962 | Livezey, Jr. | ...... E04F 15/02027 52/223.7 |
| 3,150,748 A * | 9/1964 | Liskey, Jr . | ....... E04F 15/02405 52/126.6 |
| 3,422,584 A | 1/1969 | Howard | |
| 3,449,873 A | 6/1969 | Zittler | |
| 3,464,177 A * | 9/1969 | Amato | ................ E04F 19/0495 52/288.1 |
| 3,606,714 A * | 9/1971 | Arnett | ................... E04F 19/061 52/255 |
| 3,831,334 A * | 8/1974 | Rutkowski | ............ E04F 19/045 52/288.1 |
| 4,004,381 A | 1/1977 | Pichler et al. | |

(Continued)

FOREIGN PATENT DOCUMENTS

JP    H10231611 A    9/1998

*Primary Examiner* — Gisele Ford
(74) *Attorney, Agent, or Firm* — Marsh Fischmann & Breyfogle LLP; Jonathon A. Szumny

(57) ABSTRACT

A peripheral stabilizing system for elevated flooring surfaces that is configured to resist uplift forces acting against the elevated flooring surface thereby reducing the likelihood of dislodged surface tiles and the like. Broadly, the disclosed system includes a support structure disposed over a fixed surface (e.g., roof deck or the like), a plurality of surface tiles appropriately laid over the support structure, and one or more restraint apparatuses (e.g., support ledgers) that are positionable adjacent the outer periphery of the flooring surface. Each restraint apparatus includes a mounting portion that is securable to a wall (e.g., parapet) and a restraint portion positionable over a portion of the elevated flooring surface adjacent the outer periphery for restricting movement of the flooring surface in a direction away from the fixed surface.

6 Claims, 16 Drawing Sheets

(56) References Cited

U.S. PATENT DOCUMENTS

| | | | |
|---|---|---|---|
| 4,204,376 A | 5/1980 | Calvert | |
| 4,319,520 A * | 3/1982 | Lanting | E04F 15/02423 454/290 |
| 4,565,041 A | 1/1986 | Wendt | |
| 5,184,445 A * | 2/1993 | Hoopengardner | A47G 27/0456 52/287.1 |
| 5,203,640 A * | 4/1993 | Pourtau | E04F 19/049 403/205 |
| 5,444,954 A | 8/1995 | Anderson | |
| 5,598,681 A | 2/1997 | DiGianni | |
| 6,282,855 B1 * | 9/2001 | Shipton | E04F 19/045 52/287.1 |
| 6,725,614 B2 | 4/2004 | Schiedegger et al. | |
| 6,786,016 B1 | 9/2004 | Wood | |
| 6,804,923 B1 * | 10/2004 | Potter | E04B 5/026 52/403.1 |
| 7,140,156 B1 * | 11/2006 | Lowe, Jr. | E04F 15/02183 411/457 |
| 7,360,343 B1 * | 4/2008 | Spransy | E04F 15/02452 52/263 |
| 7,703,249 B2 | 4/2010 | Rachak | |
| 8,955,263 B2 * | 2/2015 | Hatzinikolas | A62C 2/06 52/232 |
| 2004/0050009 A1 * | 3/2004 | Fuhr | E04B 1/0046 52/650.3 |
| 2005/0189723 A1 * | 9/2005 | Chassee | A47G 27/045 277/411 |
| 2006/0080939 A1 * | 4/2006 | Bledsoe | E04F 13/16 52/750 |
| 2006/0130413 A1 * | 6/2006 | Valentine | E04F 19/04 52/287.1 |
| 2009/0056235 A1 * | 3/2009 | Morsching | E04D 13/15 52/58 |
| 2014/0237912 A1 * | 8/2014 | Kugler | E04F 15/02464 52/126.6 |

\* cited by examiner

PERIPHERAL STABILIZING SYSTEM FOR ELEVATED FLOORING SURFACE

BACKGROUND OF THE INVENTION

1. Field of the Invention

This invention relates to the field of support structures for supporting and restraining an elevated surface above a fixed surface, such as support structures to elevate surface tiles for elevated floors, decks and walkways.

2. Description of Related Art

Elevated building surfaces such as elevated floors, decks, terraces and walkways are desirable in many environments. One common system for creating such surfaces includes a plurality of surface tiles, such as concrete tiles (e.g., pavers), stone tiles or wood tiles, and a support structure including, for instance, a plurality of spaced-apart support pedestals upon which the tiles are placed to be supported above a fixed surface. The support pedestals can be used in outdoor or indoor environments and may be capable of supporting heavy loads applied by many types of building surfaces. For example, in outdoor applications, the surface may be elevated above a fixed surface by the support pedestals to promote drainage, to provide a level structural surface for walking, and/or to prevent deterioration of or damage to the surface tiles.

The pedestals can have a fixed height, or can have an adjustable height such as to accommodate variations in the contour of the fixed surface upon which the pedestals are placed, or to create desirable architectural features. For instance, one type of support pedestal generally includes a threaded base member and a threaded support member that is threadably engaged with the base member to enable the height of the support pedestal to be adjusted by rotating the support member or the base member relative to the other. The support pedestal can also include a coupling or coupler member disposed between the base member and the support member for further increasing the height of the pedestal, if necessary. Alternatively, support or coupler members may be in the form of a pipe or box-shaped support that may be cut to length. Support pedestals are disclosed in U.S. Pat. No. 6,363,685 by Kugler and U.S. Patent Application Pub. No. 2004/0261329 by Kugler et al., each of which is incorporated herein by reference in its entirety.

Although a variety of shapes are possible, in many applications the surface tiles are generally rectangular in shape, having four corners. In the case of a rectangular shaped tile, each of the spaced-apart support pedestals can support four adjacent surface tiles at the tile corners. Stated another way, each rectangular surface tile can be supported by four pedestals that are disposed under each of the corners of the tile. Large or heavy tiles can be supported by additional pedestals at positions other than at the corners of the tiles.

SUMMARY OF THE INVENTION

One problem associated with some support structures for elevated surfaces is that the surface tiles or other members making up the elevated surfaces are sometimes susceptible to movement due to pressure differences above and below the tiles, such as from strong winds blowing across the surface tiles. More specifically, wind can sometimes generate uplift forces, particularly around a perimeter of an elevated building surface, that can dislodge surface tiles and thereby require subsequent repair. For instance, elevated building surfaces are sometimes built on fixed surfaces, where a support structure in the form of a plurality of support pedestals is arranged over the fixed surface and a plurality of surface tiles are appropriately placed over the support pedestals that collectively form the elevated surface. Furthermore, one or more walls (e.g., parapets, curbs, etc.) often extend upwardly from the fixed surface around and adjacent an outer periphery of the elevated surface. In the case of a building roof, a support structure and surface tiles are sometimes disposed over the roof deck and a parapet may extend upwardly away from the roof deck and surround the surface tiles.

In any event, uplift forces from wind can push against the bottom surfaces of the surface tiles adjacent the parapet and lift such tiles upwardly off of the support structure (e.g., support pedestals). In some situations, uplift forces can be greatest near the corners of the elevated building surface (e.g., where adjacent parapet sections meet) and can dislodge surface tiles which may eventually lead to displacement or buckling of other surface tiles. Furthermore, some counties and other jurisdictions have building codes specifying that elevated surface support structures must be able to withstand high winds.

In view of the foregoing, disclosed herein is a peripheral stabilizing system for elevated flooring surfaces that is configured to resist uplift forces acting against the bottom of the elevated flooring surface adjacent an outer periphery of the elevated flooring surface and thereby reduce the likelihood of dislodged surface tiles. Broadly, the disclosed system includes a support structure (e.g., plurality of spaced support pedestals or the like) disposed over a fixed surface (e.g., roof deck or the like), a plurality of surface tiles (e.g., or other building surface components) appropriately laid over the support structure, and one or more restraint apparatuses (e.g., restraint ledgers) that are positionable adjacent the outer periphery of the flooring surface. Each restraint apparatus includes a mounting portion that is securable or secured to a wall (e.g., parapet), and a restraint portion positionable over a portion of the elevated flooring surface adjacent the outer periphery for restricting movement of the outer periphery of the flooring surface in a direction away from the fixed surface.

In one aspect, a building surface assembly includes a support structure disposed on a fixed surface, a plurality of surface tiles disposed on the support structure that collectively form a flooring surface having an outer periphery that is positionable adjacent a wall that extends from the fixed surface, and a plurality of restraint apparatuses positionable adjacent the outer periphery of the flooring surface. Each of the plurality of surface tiles includes opposite top and bottom surfaces, a plurality of corner portions, and an outer edge segment between adjacent ones of the plurality of corner portions and between the top and bottom surfaces. The plurality of surface tiles includes interior surface tiles and peripheral surface tiles disposed about the interior surface tiles. The outer edge segments of the peripheral surface tiles collectively form the outer periphery of the flooring surface. Furthermore, each of the plurality of restraint apparatuses includes a mounting portion that is securable to the wall, and a restraint portion positionable over a portion of at least one of the peripheral surface tiles adjacent the outer periphery for restricting movement of the at least one peripheral surface tile in a direction away from the fixed surface. For instance, the restraint portion may be positioned over a top surface of the at least one of the peripheral surface tiles and/or within an opening (e.g., slot, kerf, elongate opening, etc.) disposed in an outer edge segment of the at least one of the peripheral surface tiles.

In another aspect, a system includes a support structure disposed on a fixed surface, a wall extending generally perpendicularly from the fixed surface, a plurality of surface tiles disposed on the support structure and including interior surface tiles and peripheral surface tiles disposed between the interior surface tiles and the wall that collectively form a flooring surface, and a plurality of restraint apparatuses secured to the wall for restricting movement of the peripheral surface tiles in a direction away from the fixed surface.

In a further aspect, a method for stabilizing a building surface assembly disposed over a fixed surface adjacent a wall extending from the fixed surface includes securing a restraint apparatus to the wall over a portion of the building surface assembly adjacent an outer periphery of the building surface assembly to restrict movement of the building surface assembly in a direction away from the fixed surface.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DESCRIPTION OF THE DRAWINGS

FIG. 3b is a side view of FIG. 3a.

FIG. 4b is a side view of FIG. 4a.

FIG. 5b is a side view of FIG. 5a.

FIG. 6b is a side view of FIG. 6a.

FIG. 7b is a side view of FIG. 7a.

FIG. 8b is a side view of FIG. 8a.

DESCRIPTION OF THE INVENTION

Figure 1:
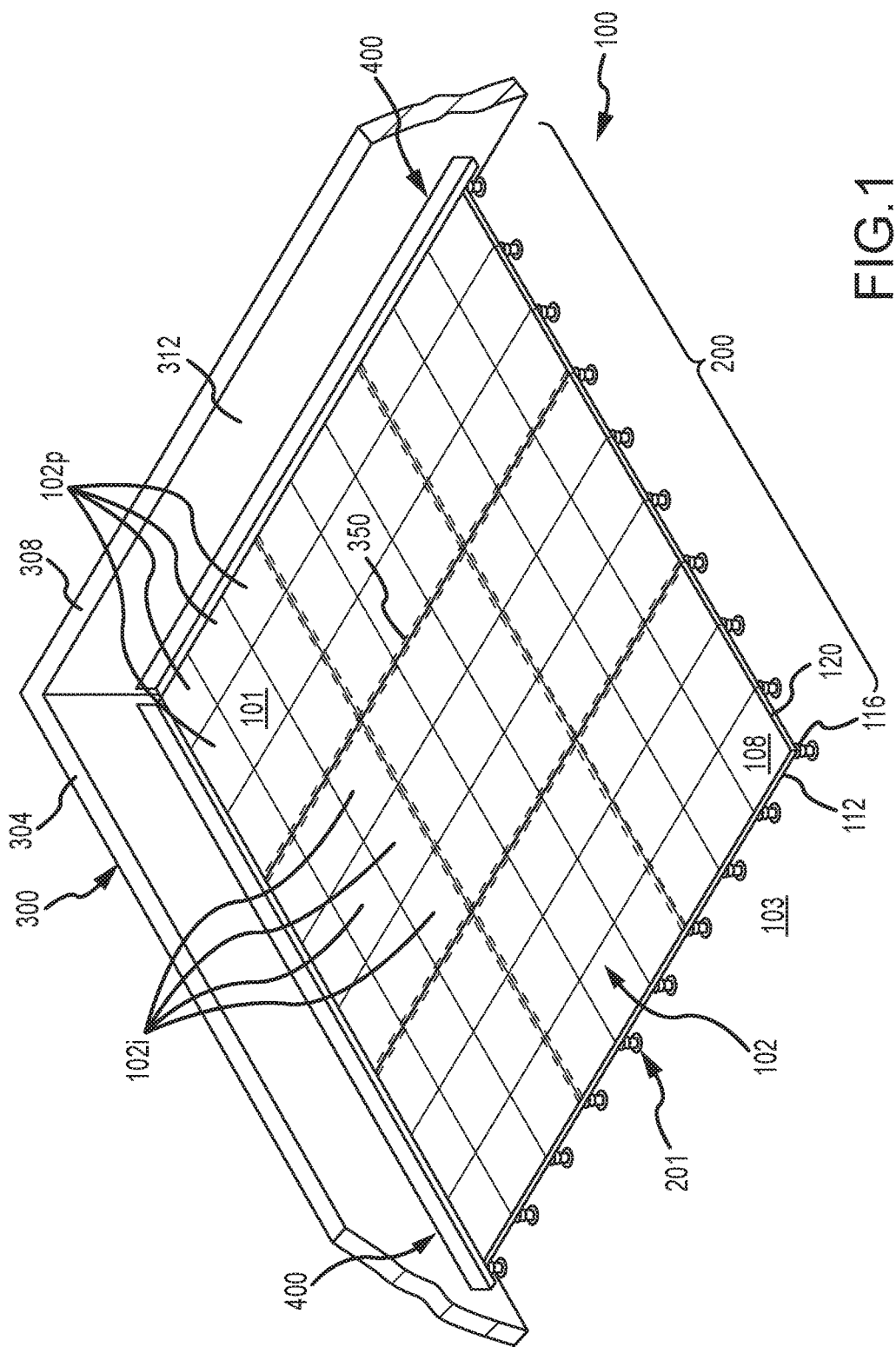
FIG. 1 is a perspective view of an elevated building surface assembly partially surrounded by a wall and including a plurality of restraint apparatuses attached to the wall for restricting movement of surface tiles away from a fixed surface according to an embodiment.

FIG. 1 illustrates a portion of an elevated building surface assembly 100 according to one embodiment that includes an elevated building surface 101 formed from a plurality of building surface components such as surface tiles 102 that are elevated above a fixed surface 103 by a support structure 200. Each surface tile 102 may broadly include generally opposing top and bottom surfaces 108, 112, one or more corner portions 116, and one or more outer edge segments 120 disposed between adjacent corner portions 116. The surface tiles 102 can be made of virtually any appropriate material(s) such as slate, natural stone, concrete (e.g., pavers), wood, metal, fiberglass, rubber, various composites, ceramic, and the like.

At least one wall 300 (e.g., parapet, curb, etc.) may extend upwardly away from the fixed surface 103 (e.g., such as the roof of a building) and generally surround at least a portion of the elevated building surface assembly 100. For instance, the wall 300 may have one or more wall sections such as first and second wall sections 304, 308. As shown, the surfaces tiles 102 may generally include interior surface tiles $102_i$ and peripheral surface tiles $102_p$ disposed between the interior surface tiles $102_i$ and an inner surface 312 of the wall 300, where outer edge segments 120 of the peripheral surface tiles $102_p$ collectively define an outer periphery of the elevated building surface 101.

The bottom surfaces 112 of the corner portions 116 of the surface tiles 102 may be placed upon several support pedestals 201 arranged in any appropriate configuration (e.g., rows and columns) to elevate the surfaces tiles 102 above the fixed surface 103 (i.e., so that a gap or distance exists between the bottom surfaces 112 of the surface tiles 102 and the fixed surface 103). For instance, some support pedestals 201 may be disposed beneath four corner portions 116 of adjacent surfaces tiles 102 while other support pedestals 201 may be disposed under the outer edge segments 120 of the surfaces tiles 102 (e.g., between the corner portions 116 and proximate to a central portion of the outer edge segment 120). Although not illustrated, support pedestals 201 may be disposed in other locations, such as below a central portion of the surfaces tiles 102.

The support pedestals 201 forming the support structure 200 may be height-adjustable, fixed height, or any combination thereof and may be constructed of any appropriate materials (e.g., metals, plastics, carbon fibers, composites, etc.). Broadly, each support pedestal 201 may include a lower portion that is adapted to be placed upon a fixed surface, an upper portion for receiving a building surface component 102, and a central section extending between or otherwise interconnecting (e.g., perpendicularly) the upper and lower portions. The support pedestals 201 may be laid out in various configurations as may be dictated by the shape and size of the building surface components, such as a rectangular configuration or a triangular configuration to support rectangular or triangular building surface components.

Figure 2:
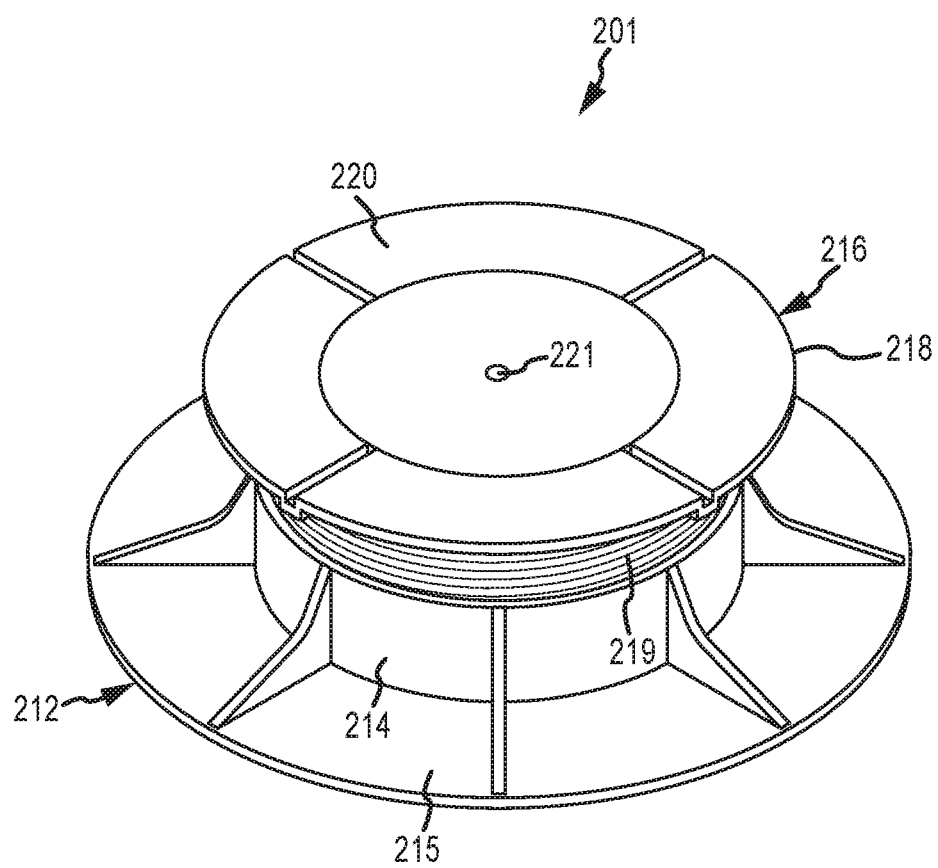
FIG. 2 is a perspective view of a support pedestal for use with the surface assembly of FIG. 1.

Turning now to FIG. 2, a support pedestal 201 (e.g., one or more of support pedestals 201 of FIG. 1) for supporting building surface components (e.g., surface tiles 102 of FIG. 1) of an elevated building surface assembly (e.g., elevated building surface assembly 100 of FIG. 1) according to one embodiment is shown. Broadly, the support pedestal 201 may include a lower portion such as a base member 212 including a base plate 215 that is configured to be placed against a fixed surface (e.g., fixed surface 103) and a base extension 214 connected to the base plate 215 in any appropriate manner and extending away from the base plate 215. The support pedestal 201 may also include an upper portion such as a support member 216 including a support plate 218 having an upper or top surface 220 over which surfaces tiles 102 are configured to be placed and support extension 219 connected to the support plate 218 in any appropriate manner and extending away from the support plate 218.

In one arrangement, the base and support extensions 214, 219 may be threadably engageable with each other to allow the height of the support pedestals 201 (i.e., the distance between the base and support plates 215, 218) to be adjusted. For instance, the base extension 214 may be in the form of a hollow cylindrical member having a threaded inner surface and the support extension 219 may be in the form of a cylindrical member having a threaded outer surface that is configured to be threadably received inside the base extension 214 (or vice versa). The base and support extensions 214, 219 may collectively form a "central section" of the support pedestal 201. In some arrangements, one or more coupling members may be incorporated between the base and support extensions 214, 219 to allow for increased heights of the support pedestal 201 (e.g., such as that disclosed in U.S. Pat. No. 8,156,694 which is incorporated herein by reference as if set forth in full). In other arrangements, the support pedestal 201 may have a fixed height, such as where the base and support plates 215, 218 are fixedly attached together by one or more rigid members that are not adjustable relative to each other.

As discussed previously, it may be desirable to resist movement of the surface tiles 102 in a direction away from the support structure 200 and the fixed surface 103 that may otherwise be induced due to strong winds blowing across and/or under the surface tiles 102, other disruptive events, and the like. In one arrangement, one or more elongate restraining members 350 (shown in schematic phantom lines in FIG. 1) may be disposed along the outer edge segments of one or more of the surface tiles 102 for use in restricting such movement of the surface tiles 102 away from the support pedestals 201. As one example, the elongate restraining members 350 may be in the form of elongate channel members (e.g., elongate C-channel members) that are disposed along the outer edge segments 120 of one or more pairs of abutting or adjacent surface tiles 102. For instance, each elongate channel member may include a restraint portion that is disposed over a portion of a surface tile 102 along its outer edge segment 120 (e.g., over its top surface 108, within an elongated opening in the outer edge segment 120, etc.) and a mounting portion that is secured or affixed to one or more support pedestals 201 over which the surface tiles 102 are laid. In one embodiment, the elongate channel members may be one or more of those disclosed in U.S. Pat. No. 9,038,324, assigned to the assignee of the present application, and which is incorporated herein by reference in its entirety.

As another example, the elongate restraining members 350 may be in the form of one or more elongate restraint splines that may be received in elongate openings (e.g., slots) that extend along the outer edge segments 120 of adjacent surface tiles 102, where the elongate restraint splines may be unattached to the support pedestals 201. For instance, the restraint splines and elongate openings may be similar to those disclosed in U.S. Patent App. Pub. No. 2015/0308126, assigned to the assignee of the present application, and which is incorporated herein by reference in its entirety. As a further example, one or more tie-down devices (not shown) may be used to secure one or more of the corner portions 116 of the surface tiles to the support pedestals 201. For instance, the tie-down devices may include one or more of the anchoring washer and fastener arrangements disclosed in U.S. Pat. No. 8,302,356, assigned to the assignee of the present application, and which is incorporated herein by reference in its entirety.

Figure 3A:
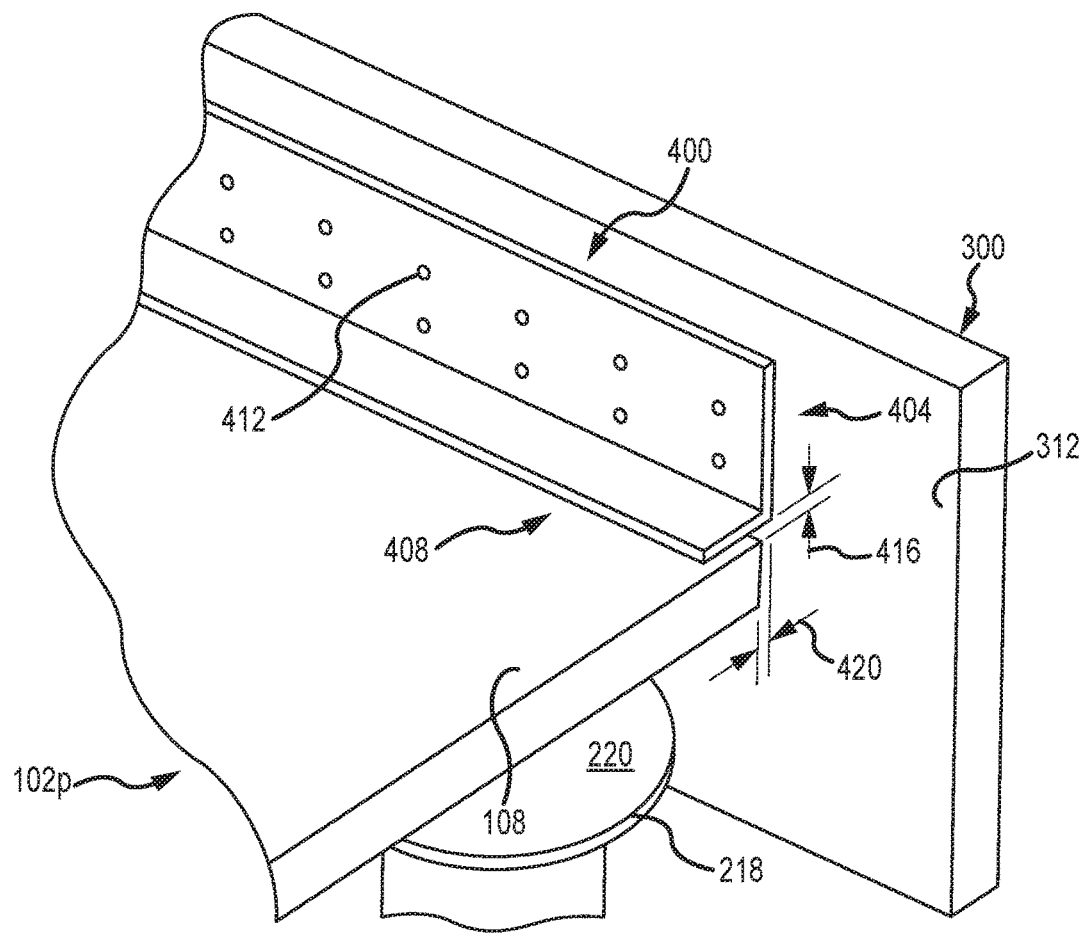
FIG. 3a is a perspective view of a portion of the elevated building surface assembly of FIG. 1 and illustrating a restraint apparatus secured to the wall for limiting movement of a surface tile of the assembly away from a fixed surface.
Figure 3B:
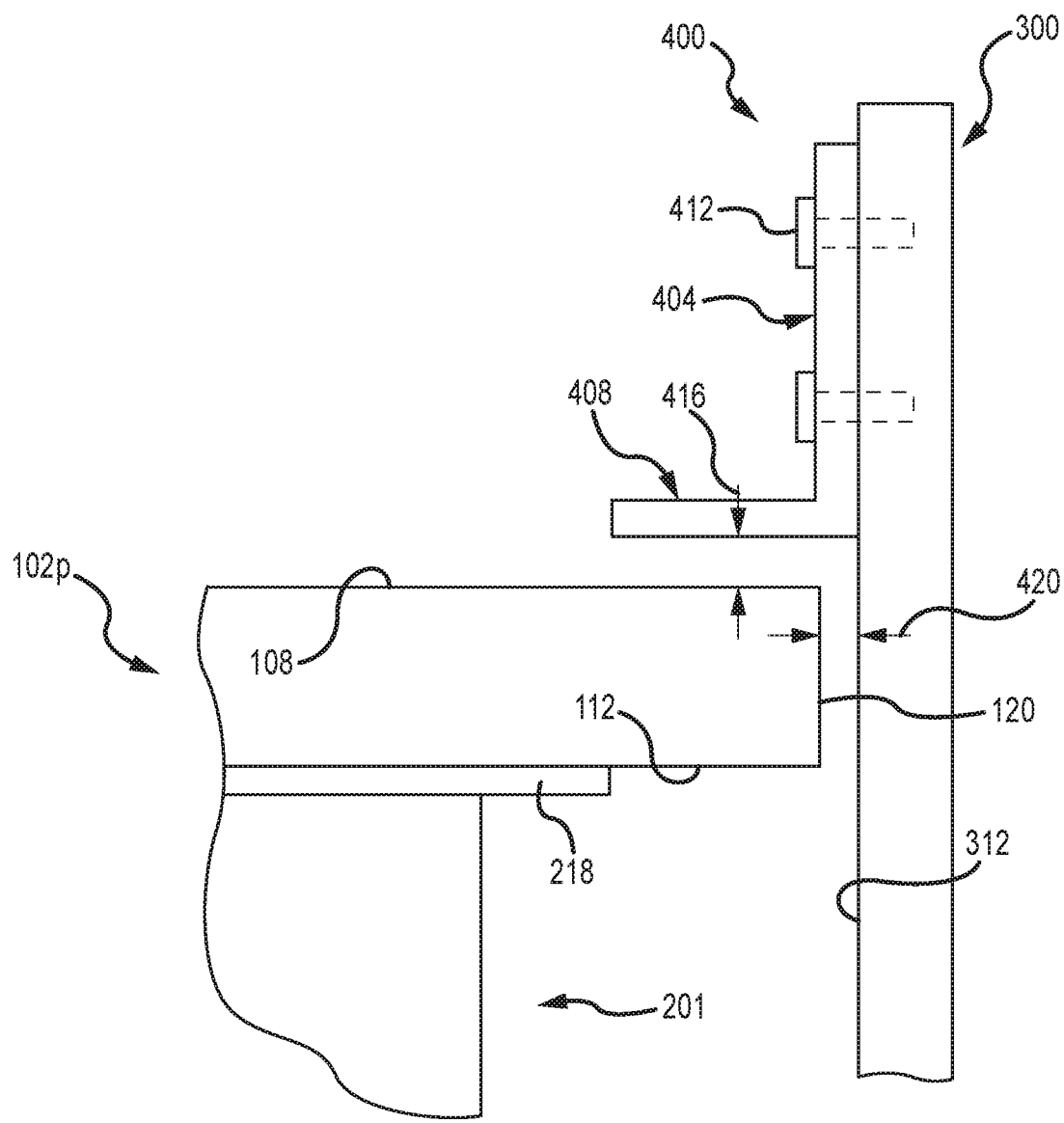

In another arrangement, the elevated building surface assembly 100 may include one or more restraint apparatuses 400 (e.g., restraint ledgers) that are secured or securable to the wall 300 for use in restricting movement of the surface tiles 102 in a direction away from the support structure 200 and the fixed surface 103. More specifically, each restraint apparatus 400 is configured to be attached to the wall 300 along an outer periphery of the elevated building surface 101 for use in directly inhibiting movement of the peripheral surface tiles $102_p$ away from the support structure 200. With reference now to FIGS. 1, 3a and 3b, each restraint apparatus 400 generally includes a mounting portion 404 that is securable to the wall 300 and a restraint portion 408 that is positionable over a portion of at least one of the peripheral surface tiles $102_p$ adjacent the outer periphery of the elevated building surface 101 for restricting movement of the at least one peripheral surface tile $102_p$ in a direction away from the fixed surface 103 and support structure 200.

Broadly, the mounting portion 404 is configured to be rigidly attached to the wall 300 (i.e., substantially nonmovable relative to the inner surface 312 of the wall 300) along at least a portion of a length of the outer periphery of the elevated flooring surface 103. In one arrangement, the mounting portion 404 may be in the form of an elongate member (e.g., plate, strip, plank, board, etc.) that extends along and parallel to the outer periphery of the elevated flooring surface 103. Furthermore, the mounting portion 404 may be rigidly attached or connected to the wall 300 in any appropriate manner. In one arrangement, a plurality of fasteners 412 (e.g., bolts, screws, etc.) may be inserted into corresponding pre-formed apertures in the mounting portion 404 and in the wall 300 or may otherwise self-tap into the mounting portion 404 and the wall 300 to secure the mounting portion 404 to the wall 300 (e.g., against the inner surface 312). Additionally or alternatively, any appropriate adhesive (e.g., liquid, double-sided tape, etc.) may be used to secure the mounting portion 404 to the inner surface 312 of the wall 300.

The restraint portion 408 is configured to be disposed over at least a portion of one or more peripheral surface tiles $102_p$ adjacent the outer periphery of the elevated flooring surface 103 for limiting movement of the one or more peripheral surface tiles $102_p$ in a direction away from the support pedestals 201 (e.g., in an upward direction parallel to the inner surface 312 of the wall 300). More specifically, the restraint portion 408 is configured to receive uplift forces applied to the peripheral surface tile $102_p$ and transmit the same to the mounting portion 404 and thus the wall 300 which serve to provide a substantially equal and opposite reaction force to inhibit upward movement of the peripheral surface tile $102_p$ away from the support pedestal 201 and fixed surface 103. In this regard, the wall 300 may be designed to substantially resist loads applied to it (e.g., tension, shear, etc.) via the peripheral surface tiles $102_p$ and the restraint apparatuses 400.

In one embodiment, the restraint portion 408 may positioned over the top surface 108 of the peripheral surface tiles $102_p$ as shown in FIGS. 3a-3b. In another arrangement, the restraint portion 408 may be receivable in an opening 190 (e.g., slot, kerf, etc.) disposed in the outer edge segment 120 of the peripheral surface tiles $102_p$. See FIG. 10. As just one example, the peripheral surface tiles $102_p$ may be in the form of one or more of the surface tiles disclosed in U.S. Pat. No. 721,445, assigned to the assignee of the present application, and which is incorporated herein by reference in its entirety.

In one arrangement, the restraint apparatus 408 may be in the form of an elongate member (e.g., plank, board, sheet, strip, etc.) that is disposed over or otherwise runs along the top surface 108 of the one or more peripheral surface tiles $102_p$ adjacent the outer periphery of the elevated flooring surface 101. As an example, and with reference to FIGS. 3a-3b, the restraint portion 408 may be in the form of an elongate strip of material that is rigidly attached to the mounting portion 404 so as to be generally non-movable relative to the mounting portion 404. For instance, the mounting portion 404 and restraint portion 408 may be in the form of a unitary, rigid, one-piece member of any appropriate cross-section (e.g., L-shaped, C-shaped, cylindrically-shaped, oval-shaped, etc.), where the mounting portion 404 is attached to the wall 300 and the restraint portion 408 extends away from the mounting portion 404 (and thus the wall 300) so as to overlie the top portion 108 of the one or more peripheral surface tiles $102_p$ along the outer periphery of the elevated flooring surface 101. In the embodiment of FIGS. 3a-3b, the restraint portion 408 may extend generally perpendicularly away from a lower portion (not labeled) of the mounting portion 404 and the inner surface 312 of the wall 300 so as to extend substantially parallel to the top surface 108 of the peripheral surface tile $102_p$.

In the event the restraint portion 408 is disposed over the top surface 108 of the peripheral surface tiles $102_p$, the restraint apparatus 400 and peripheral surface tiles $102_p$ may be positioned such that a small gap 416 exists between the top surface 108 of the peripheral surface tiles $102_p$ and the bottom surface (not labeled) of the restraint portion 408 to allow for any expansion of the peripheral surface tiles $102_p$ (e.g., in an upward direction parallel to the inner surface 312 of the wall 300), to allow peripheral surface tiles $102_p$ of different thicknesses (i.e., the distance between the top and bottom surfaces 108, 112) to utilize the restraint apparatus 400 free of having to reposition the restraint apparatus 400 upwardly or downwardly along the inner surface 312 of the wall 300, and the like. For instance, the gap 416 may be not greater than about 1 inch, such as not greater than about ½ inch. In the event the restraint portion 408 is disposed over a portion of the peripheral surface tiles $102_p$ within an opening 190 therein, one or more gaps may exist between the restraint portion 408 and upper or lower interior surfaces defining the opening 190.

In some arrangements, the restraint apparatus 400 and peripheral surface tiles $102_p$ may be positioned such that the top surface 108 of the peripheral surface tiles $102_p$ are in contact with the bottom surface of the restraint portion 408 and/or exert a slight upward pressure against the bottom surface of the restraint portion 408 even in the absence of uplift loads from wind events or the like. As also shown in FIGS. 3a-3b, the peripheral surface tiles $102_p$ may be positioned such that a small gap 420 exists between the outer edge segment 120 of the peripheral surface tiles $102_p$ and the inner surface 312 of the wall 300 to allow for any expansion of the peripheral surface tiles $102_p$ (e.g., in an outward direction towards the inner surface 312) and the like. For instance, the gap 420 may be not greater than about 1 inch, such as not greater than about ½ inch. In any case, the restraint apparatus 400 may extend across the gap 420 or else an interface between the inner surface 312 and the outer edge segment 120 of the peripheral surface tiles $102_p$.

Figure 4A:
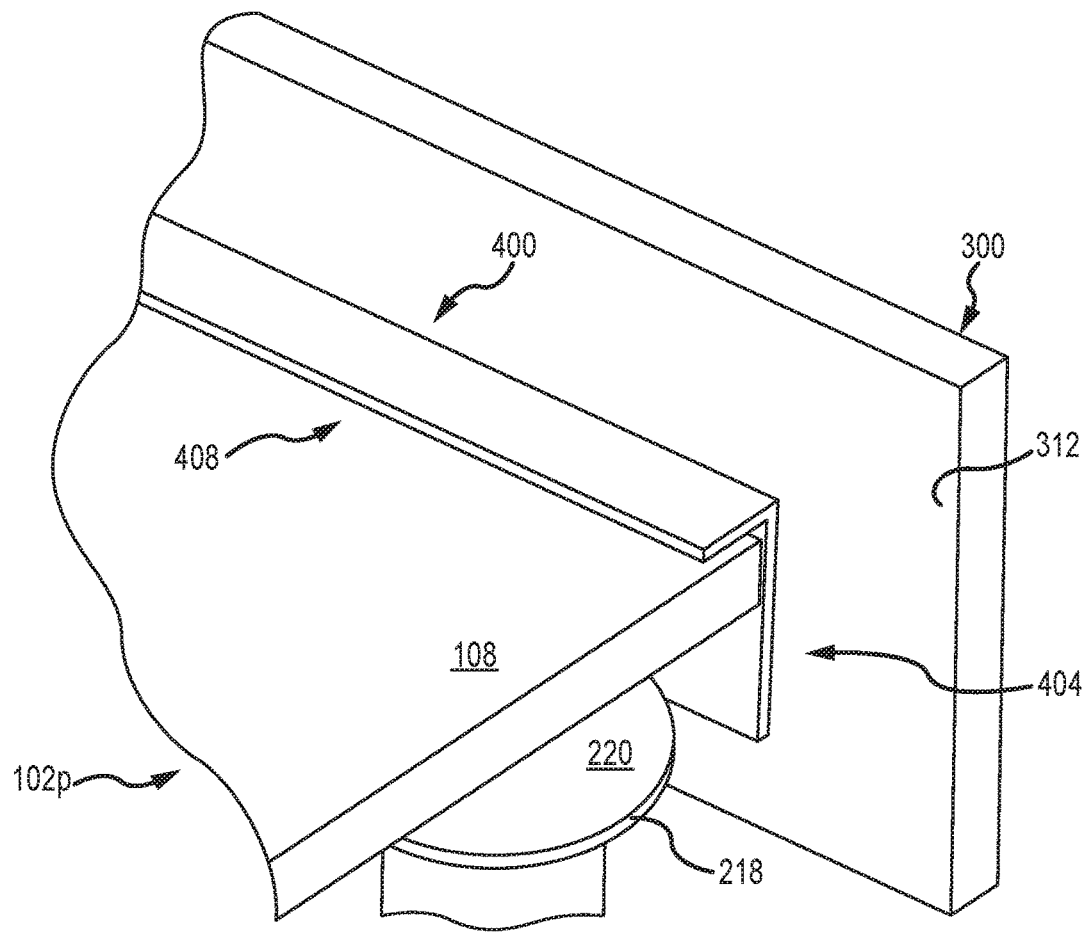
FIG. 4a is a perspective view similar to FIG. 3a but with the restraint apparatus disposed in a different position.
Figure 4B:
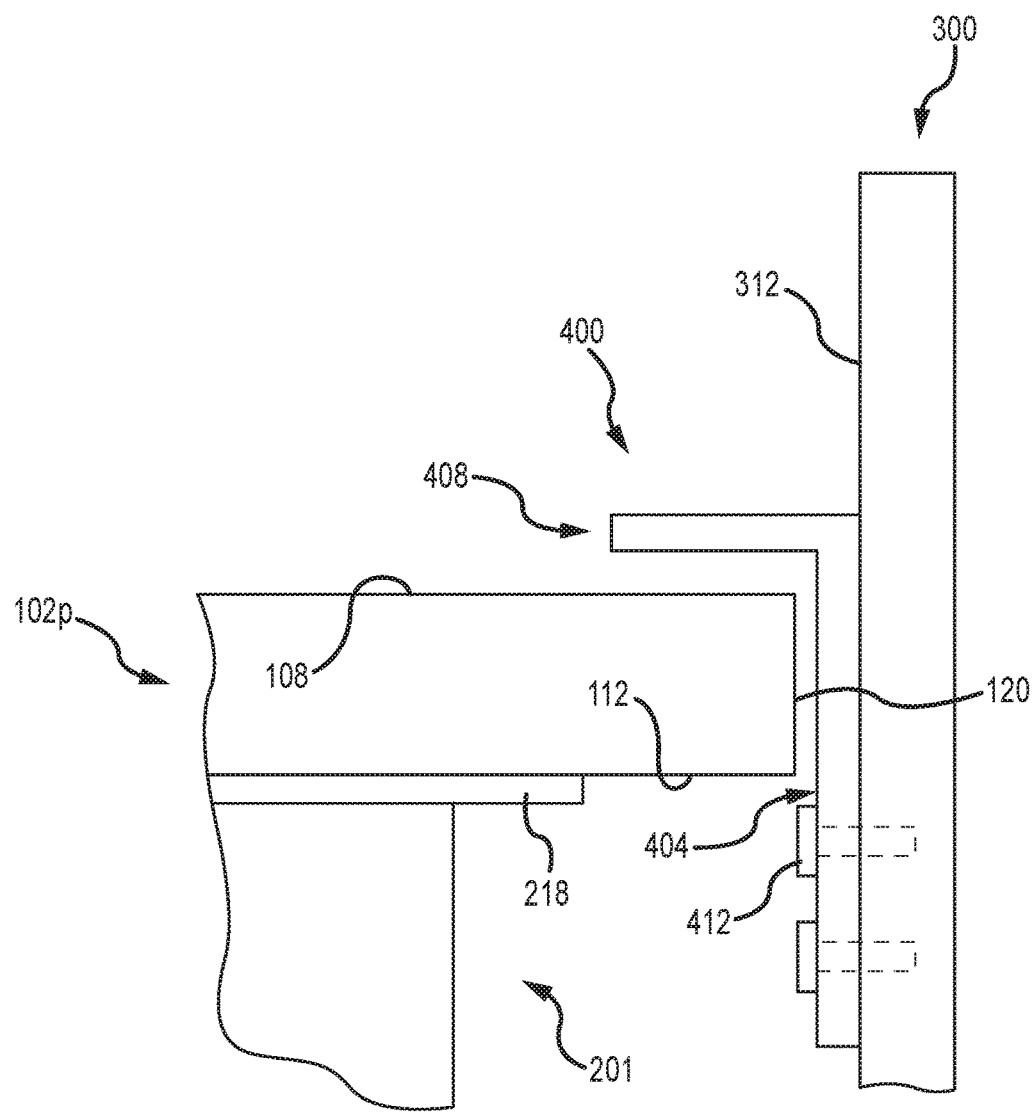
Figure 10:
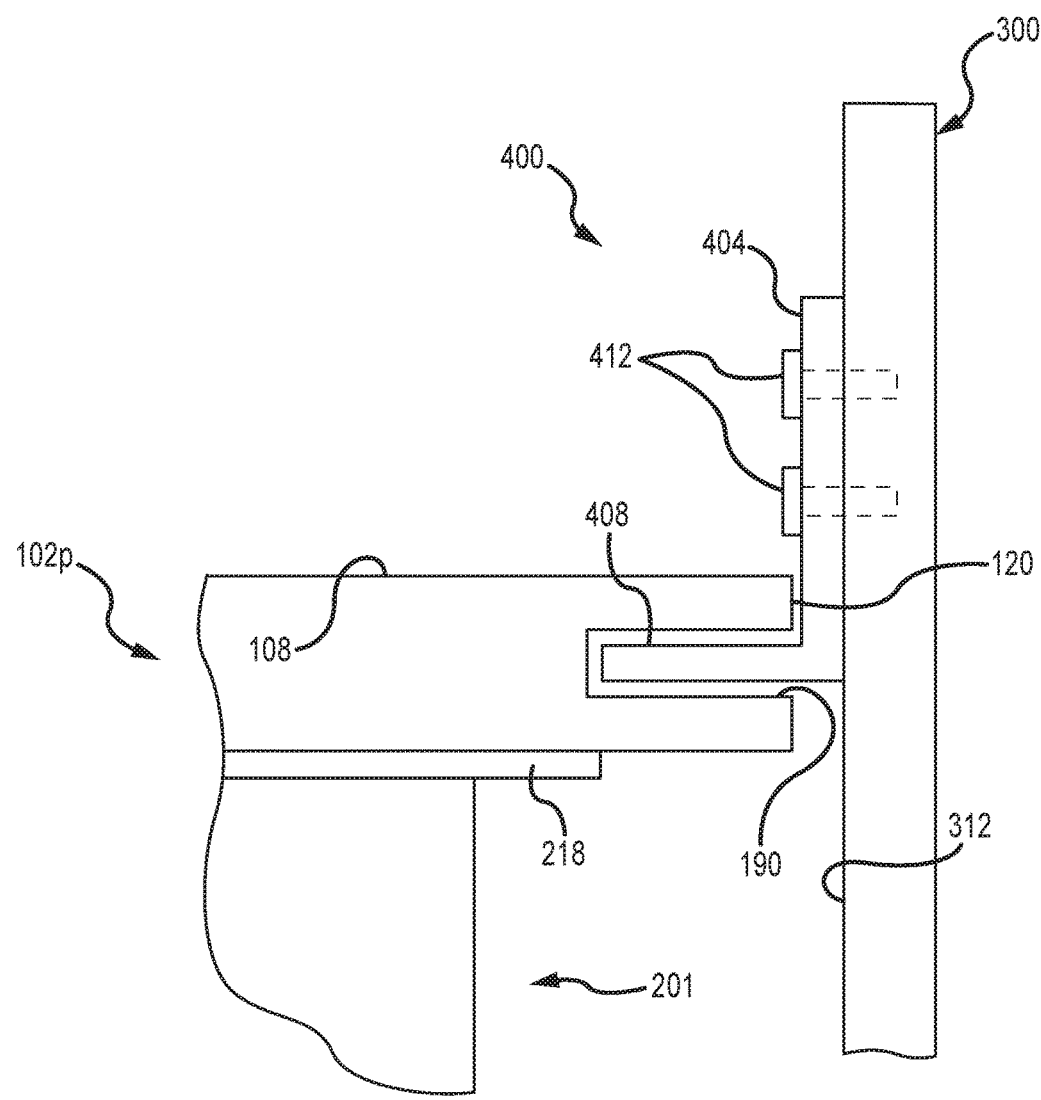
FIG. 10 is a perspective view similar to FIG. 3a but with the restraint apparatus disposed in a different position.

FIGS. 4a-4b illustrate another arrangement in which the restraint apparatus 400 of FIGS. 3a-3b has been flipped by 180° so that the mounting portion 404 extends downwardly from the restraint portion 408 in between the outer edge segments 120 of the peripheral surface tiles $102_p$ and the inner surface 312 of the wall 300 and along the inner surface 312. In other words, the restraint portion 408 extends away (perpendicularly, in this embodiment) from a top portion of the mounting portion 404 and over the top surface 108 of the peripheral surface tiles $102_p$ (or into an opening 190 in the outer edge segment 120 such as shown in FIG. 10). In this arrangement, there may be a gap (not labeled) between the outer edge segment 120 and the mounting portion 404 (e.g., similar in magnitude to the gap 420). The mounting portion 404 may be rigidly attached to the inner surface 312 of the wall 300 with fasteners 412, adhesives, and/or the like as discussed above. In one arrangement, the mounting portion 404 may be rigidly attached to the inner surface 312 of the wall 300 at a location or height below the peripheral surface tile $102_p$ (e.g., between the peripheral surface tile $102_p$ and the fixed surface 103 (not shown in FIG. 4b). Additionally or alternatively, the mounting portion 404 may be rigidly attached to the inner surface 312 at a location or height substantially even with the surface tile $102_p$, such as across from the outer edge segment 120.

Figure 5A:
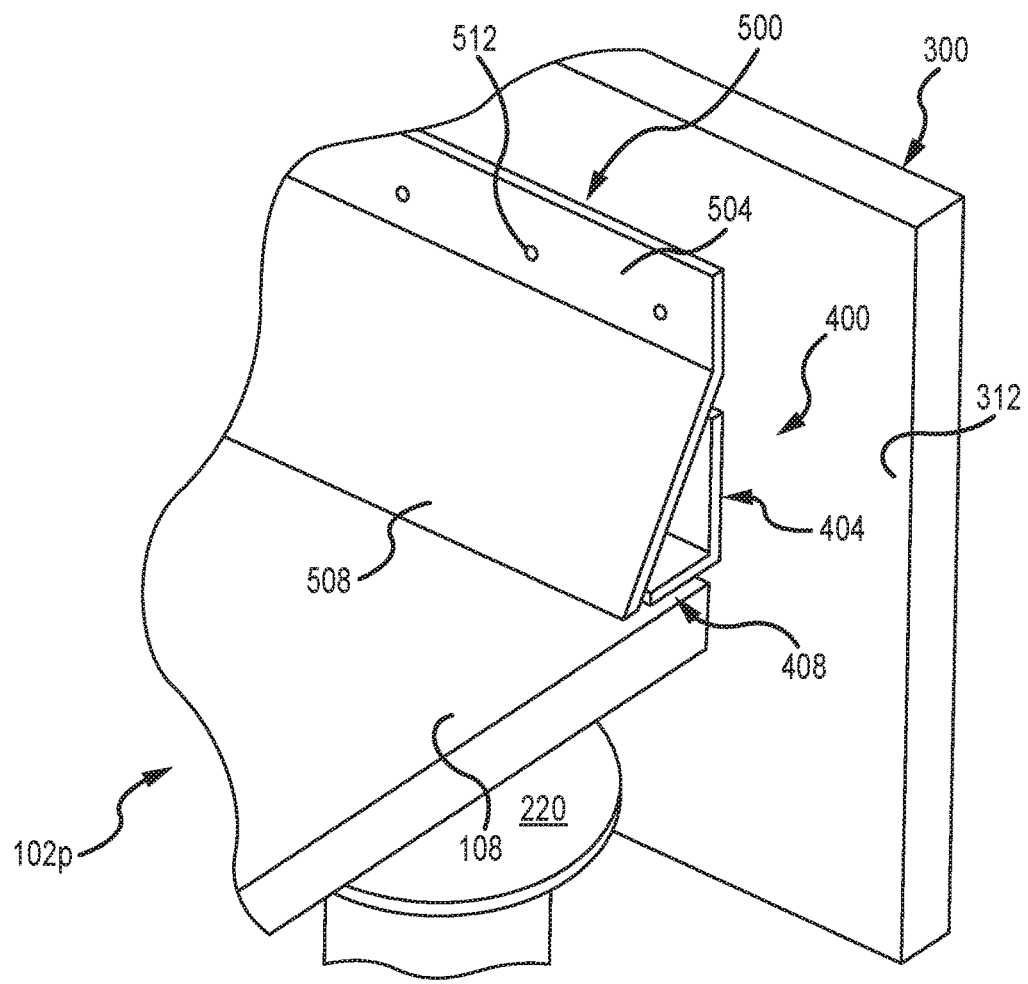
FIG. 5a is perspective view similar to FIG. 3a but including a counterflashing member attached to the wall and disposed over the restraint apparatus.
Figure 5B:
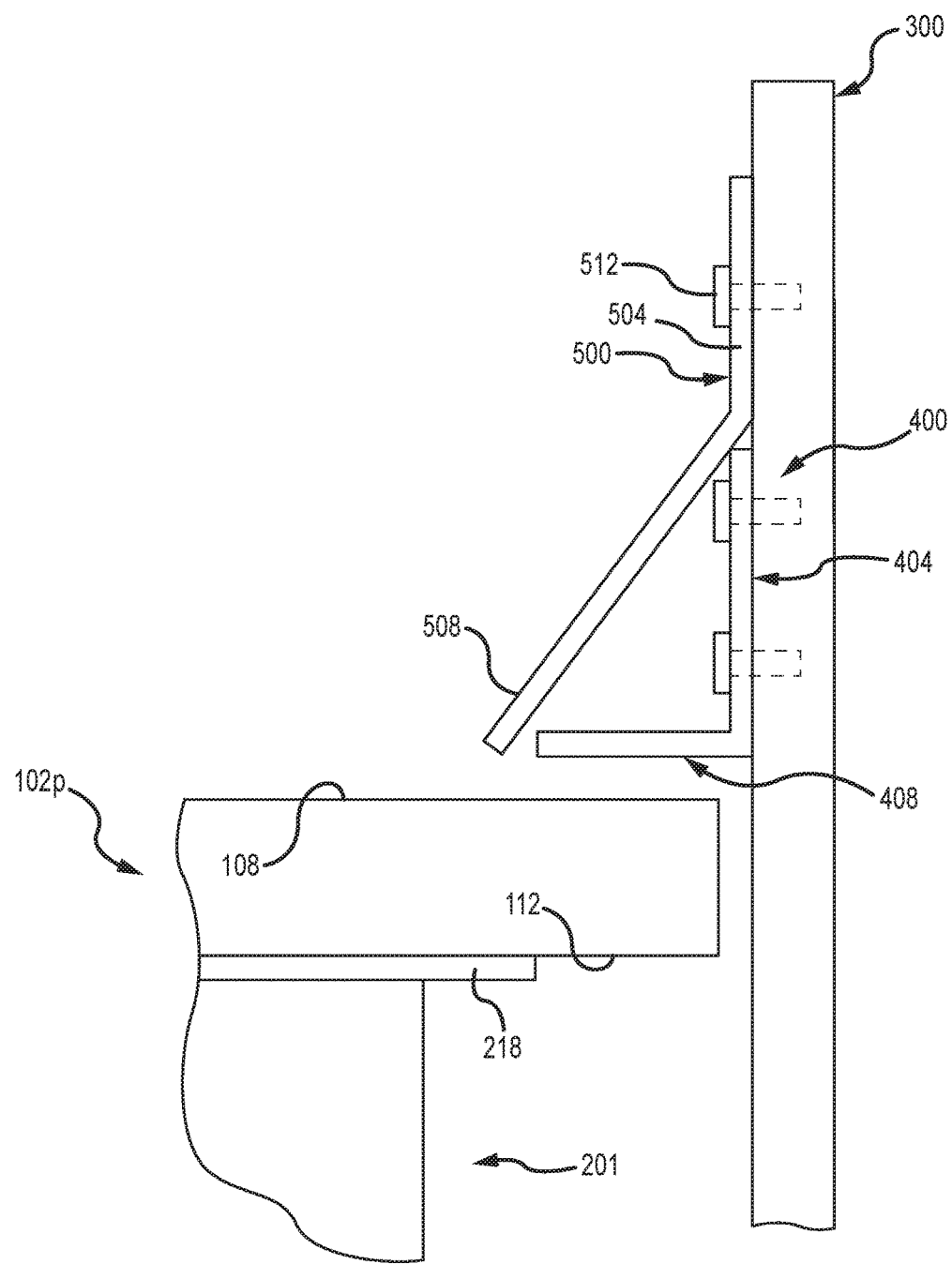

FIGS. 5a-5b illustrate another arrangement similar to FIGS. 3a-3b in which a cover member 500 has been secured to the wall 300 to inhibit liquids, debris and the like from seeping or passing from locations above the top surface 108 of the peripheral surface tiles $102_p$ down between the outer edge segment 120 and the inner surface 312 of the wall 300 to locations below the bottom surface 112 of the surface tiles 102 toward the fixed surface 103. For instance, the cover member 500 may include a mounting portion 504 that may be secured to the inner surface 312 of the wall 300 at one or more locations above where the mounting portion 404 of the restraint apparatus 400 has been secured to the wall 300 (e.g., with fasteners 512, adhesives, and/or the like), and a cover portion 508 that is broadly configured to cover or conceal at least a majority of the restraint apparatus 400 (e.g., so that the restraint apparatus 400 is generally contained or concealed by the cover member 500, the inner surface 312 of the wall 300, and the peripheral surface tiles $102_p$. In one arrangement, the cover member 500 may be in the form of a counterflashing member of any appropriate shape. While one particular form of the cover member 500 has been shown in FIGS. 5a-5b, it is to be understood that the cover member 500 may take various other forms all of which are encompassed in the present disclosure.

Figure 6A:
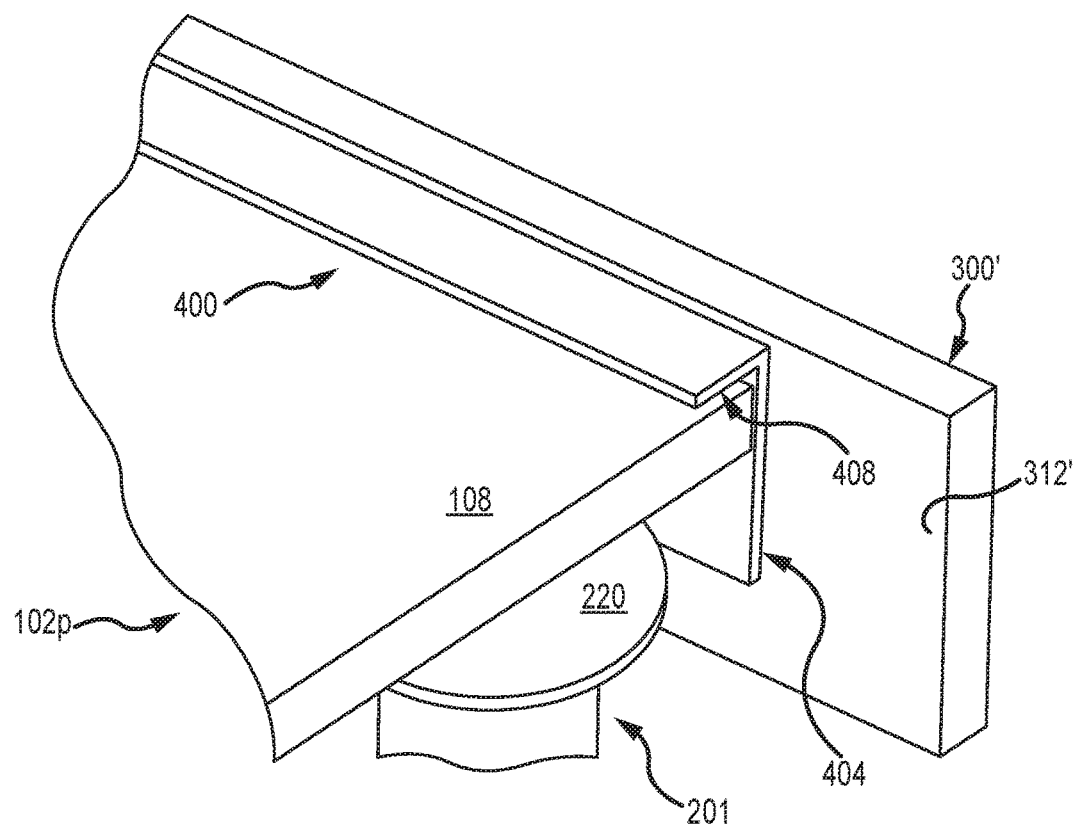
FIG. 6a is a perspective view similar to FIG. 4a but attached to a different wall.
Figure 6B:
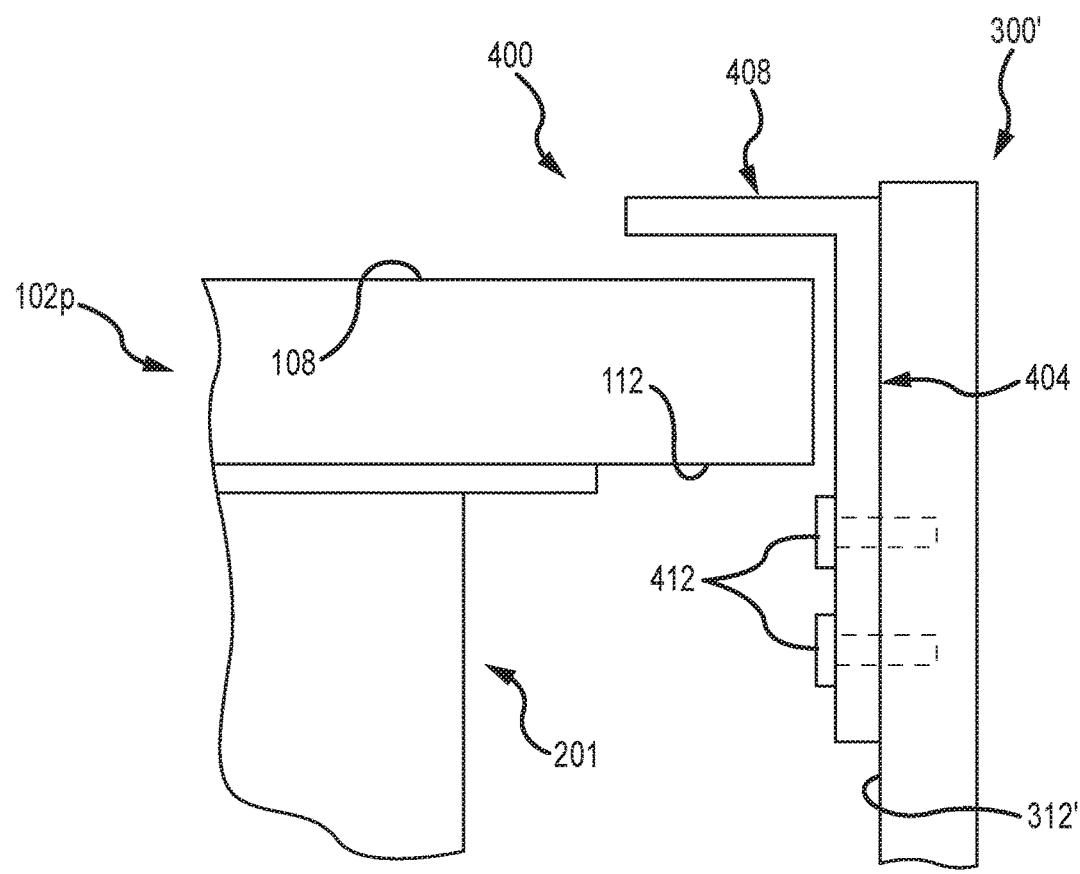

FIGS. 6a-6b illustrate the restraint apparatus 400 in the orientation of FIGS. 4a-4b being attached to another wall 300' (e.g., curb, etc.) that may be shorter than the wall 300 of FIGS. 4a-4b. As shown, the mounting portion 404 may be attached to the inner surface 312' such that the restraint portion 408 is substantially level with a top edge (not labeled) of the wall 300'. In one arrangement, the mounting portion 404 may additionally or alternatively be appropriately rigidly attached to the top (horizontal) edge of the wall 300'. As just one example, the mounting portion 404 may be in the form of a C-shaped channel having first and second legs configured to fit over the top edge of the wall 300' so as to hang down over first and second opposite surfaces of the wall (where the restraint portion 408 would extend away from one of the first and second legs).

Figure 7A:
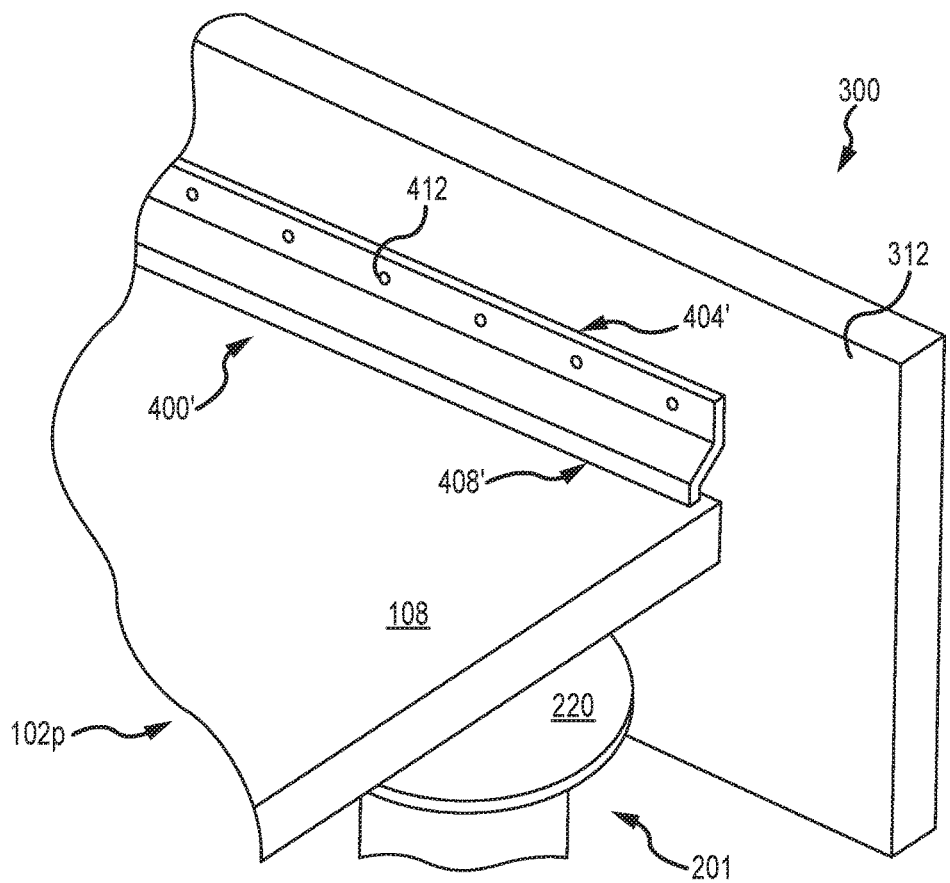
FIG. 7a is a perspective view of a portion of the elevated building surface assembly of FIG. 1 and illustrating a restraint apparatus according to another embodiment secured to the wall for limiting movement of a surface tile of the assembly away from a fixed surface.
Figure 7B:
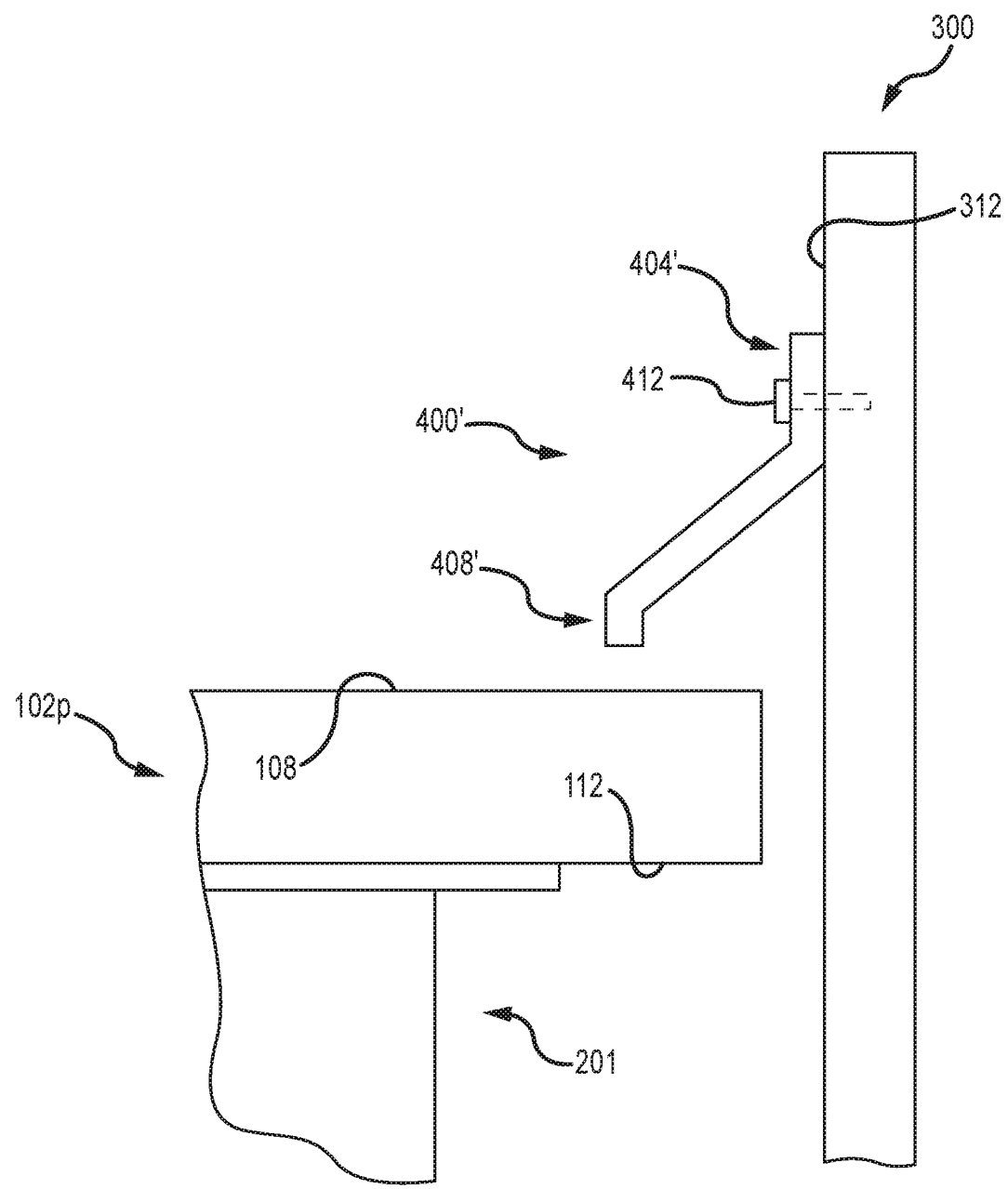

FIGS. 7a-7b illustrate another embodiment of a restraint apparatus 400' in which the restraint apparatus 400' is in the form of a counterflashing member having a mounting portion 404' that is configured to be rigidly secured to the inner surface 312 of the wall 300 (e.g., via fasteners 412, adhesives, and/or in other appropriate manners) and a restraint portion 408' extending from the mounting portion 404' and that is configured to be disposed over the top portion 108 of the peripheral surface tiles $102_p$ to inhibit movement thereof in a direction away from the support pedestal 201 and the fixed surface 103. In one arrangement, the restraint apparatus 400' may be in the form of the cover member 500 of FIGS. 5a-5b where the mounting portion 504 would serve as the mounting portion 404' of the restraint apparatus 400' and the cover portion 508 would serve as the restraint portion 408'. The restraint apparatus 400' may also take various other forms and shapes consistent with the present disclosure.

Figure 8A:
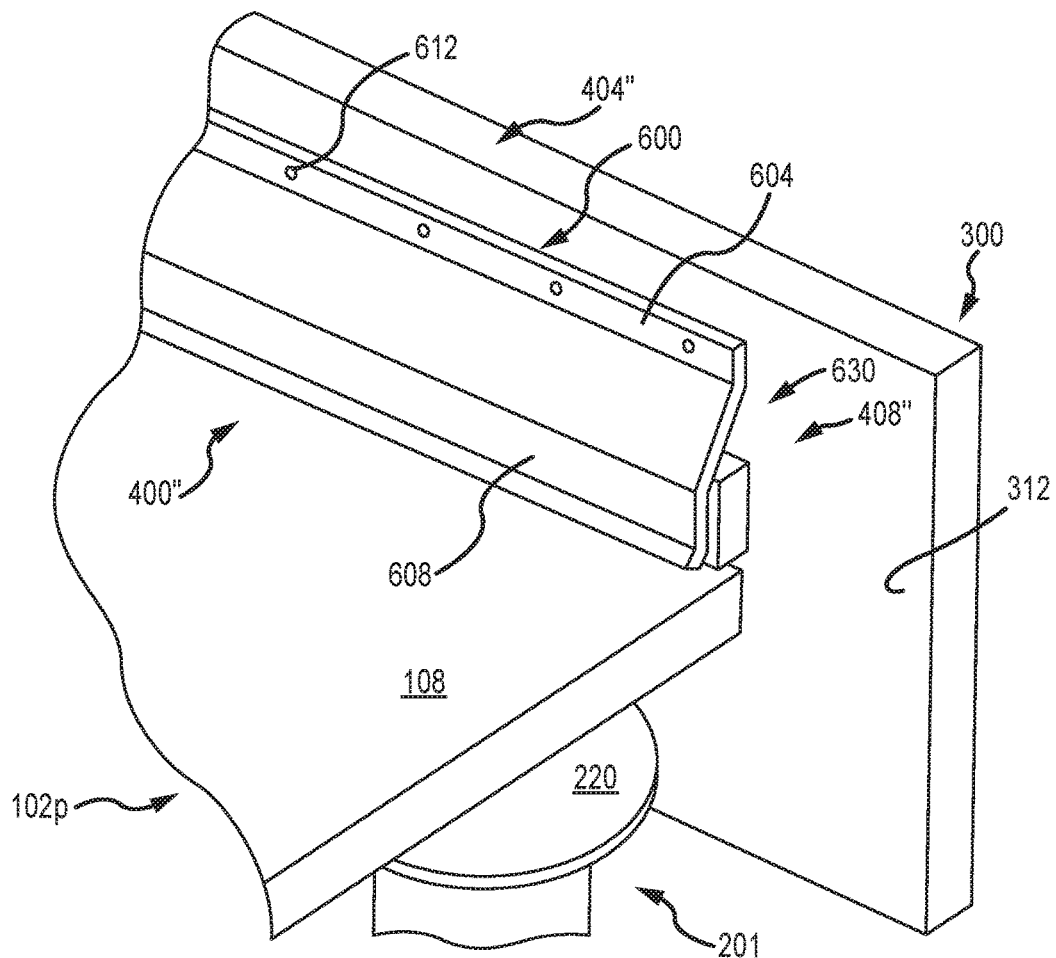
FIG. 8a is a perspective view of a portion of the elevated building surface assembly of FIG. 1 and illustrating a restraint apparatus according to another embodiment secured to the wall for limiting movement of a surface tile of the assembly away from a fixed surface.
Figure 8B:
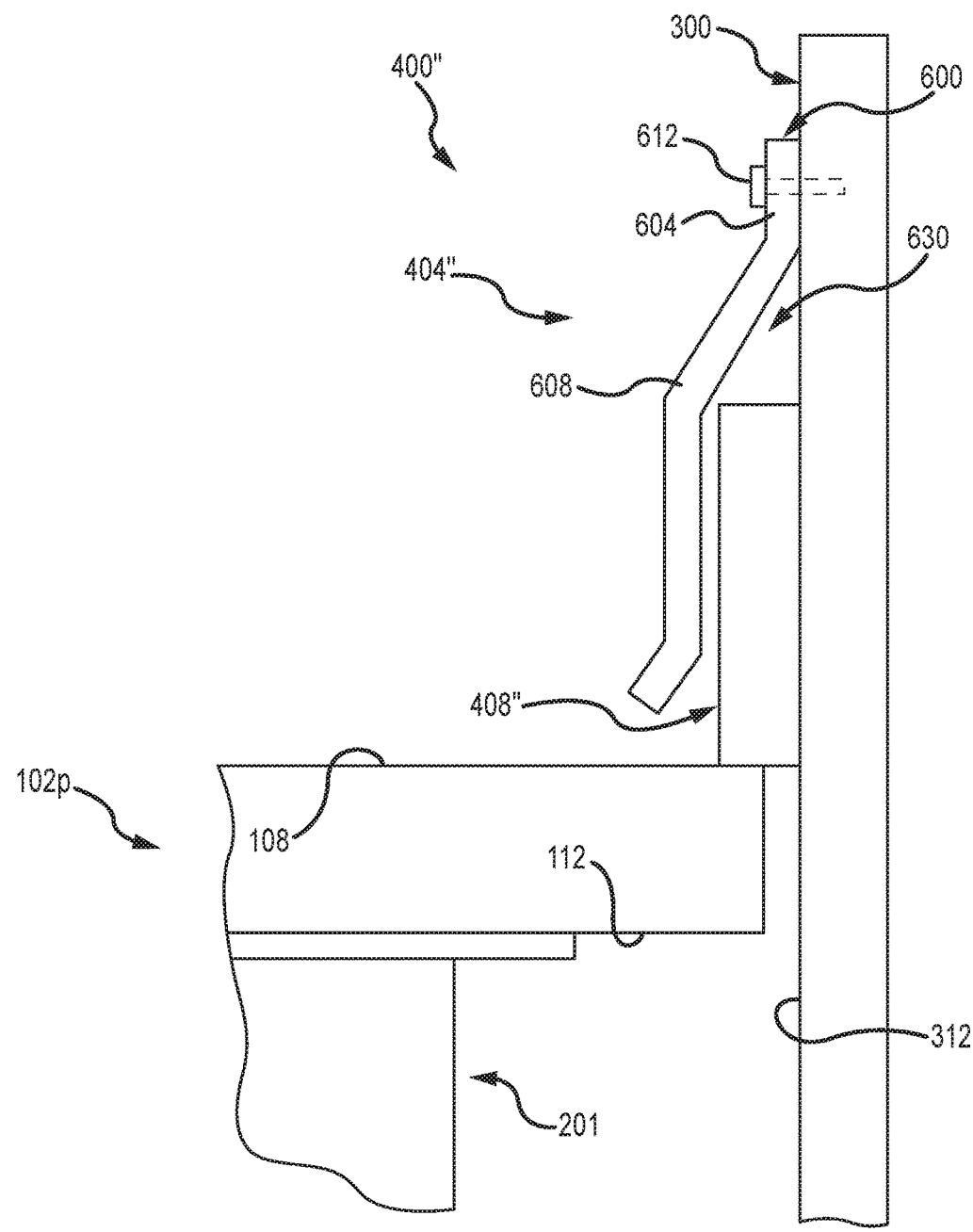

FIGS. 8a-8b illustrate another embodiment of a restraint apparatus 400" in which the mounting portion 404" and the restraint portion 408" are separate members or components (i.e., the restraint apparatus 400" is not a unitary, one-piece structure). For instance, the mounting portion 404" may be in the form of a cover member 600 (e.g., the cover member 500 of FIGS. 5a-5b) having a mounting portion 604 that is configured to be rigidly attached to the inner surface 312 of the wall 300 in any appropriate manner (e.g., via fasteners 612, adhesives, and/or the like) and a cover portion 608 that extends away from the mounting portion 604 and the inner surface 312 to create a space or cavity 630 between the cover portion 608 and the inner surface 312 for receipt of the restraint portion 408". The restraint portion 408" may be in the form of any appropriate elongate member that is configured to be received in the cavity 630 and disposed over the top portion 108 of the one or more peripheral surface tiles $102_p$ to inhibit movement thereof in a direction away from the support pedestal 201 and the fixed surface 103.

In the embodiment of FIGS. 8a-8b, the restraint portion 408" may be unattached to the mounting portion 404", the wall 300 and the one or more peripheral surface tiles $102_p$ such that the bottom portion (not labeled) of the restraint portion 408" rests on the top surface 108 of the one or more peripheral surface tiles $102_p$. In the case of an uplift force being applied to the one or more peripheral surface tiles $102_p$, the top surface 108 of the one or more peripheral surface tiles $102_p$ may apply a load against the bottom portion of the restraint portion 408" in an upward direction substantially parallel to the inner surface 312. The upward load applied against the bottom portion of the restraint portion 408" may be substantially immediately resisted by the mounting portion 408" by way of an opposite downward reaction load being applied against the top portion (not labeled) of the restraint portion 408".

As shown in FIG. 8b, a small gap may exist between the top portion of the restraint portion 408" and the mounting portion 404" (in the vertical direction parallel to the inner surface 312) to allow for expansion of the one or more peripheral surface tiles $102_p$ and/or the like (e.g., not greater than about ½ inch). In one arrangement, the restraint portion 408" may be rigidly secured to the inner surface 312 of the wall 300 such as through fasteners, adhesives, and/or the like. In this case, the restraint portion 408" may be mounted in a manner that provides a small gap between the bottom portion of the restraint portion 408" and the top surface 108 of the one or more peripheral surface tiles $102_p$. Additionally or alternatively, the The restraint apparatuses 400, 400', 400" disclosed herein may be constructed of any appropriate materials consistent with the functionalities disclosed herein such as wood, plastics, metals, reinforced composites, ceramic, glass, fiberglass, or combinations thereof. In some arrangements, the restraint portions 408, 408', 408" may be constructed or arranged to allow for slight upward movement (e.g., such as no more than about 1 inch, such as no more than about ½ inch) of the peripheral surface tiles $102_p$ along or parallel to the inner surface 312 even in the absence of gaps between the top surface 108 of the peripheral surface tiles $102_p$ and the bottom portion of the restraint portions 408, 408', 408" and/or between the top portion of the restraint portion 408" and the mounting portion 404" (e.g., to allow for expansion of the peripheral surface tiles $102_p$, to allow for peripheral surface tiles $102_p$ of differing thicknesses to be used with the restraint apparatuses, and/or the like). For instance, the restraint portion 408, 408', 408" may be positioned at a non-perpendicular angle relative to the top surface 108 of the peripheral surface tiles $102_p$ so as to be slightly resilient when the peripheral surface tiles $102_p$ apply an upward load thereon and/or may be constructed of a material that is inherently resilient (e.g., plastic sheeting, a dense flexible material, etc.).

It is to be understood that the particular size of the gaps and/or the particular degree of resiliency of the restraint portion 408, 408', 408" may be chosen to allow for a particular desired or allowed amount of expansion of the peripheral surface tiles $102_p$, a particular range of thicknesses (or thickness tolerances) of peripheral surface tiles $102_p$ to be accommodated by the restraint apparatus 400, 400', 400", etc. before the restraint apparatus resists upward movement of the peripheral surface tiles $102_p$.

In one embodiment, the peripheral surface tiles $102_p$ may be loosely laid over the support structure 200 (e.g., over the support pedestals 201) or in other words not rigidly attached to the support structure. In one arrangement, adjacent surface tiles 102 may be interconnected in any appropriate manner. For instance, one or more elongate restraint splines may be received in elongate openings (e.g., slots) that extend along the outer edge segments 120 of adjacent surface tiles 102. In the case where an elongate restraint spline extended through openings in abutting interior surface tiles $102_i$ and then through openings in adjacent abutting peripheral surface tiles $102_p$ (e.g., so that the abutting interior surface tiles $102_i$ where interconnected to the abutting peripheral surface tiles $102_p$) the restraint apparatus 400, 400', 400" may also serve to restrict or reduce movement of such abutting interior surface tiles $102_i$ in an upward direction away from the support structure 200. For instance, the restraint splines and elongate openings may be similar to those disclosed in U.S. Patent App. Pub. No. 2015/0308126, assigned to the assignee of the present application, and which is incorporated herein by reference in its entirety.

One method for stabilizing a building surface assembly disposed over a fixed surface adjacent a wall extending from the fixed surface will now be described. A support structure 200 such as a plurality of support pedestals 201 may be appropriately located upon a fixed surface 103 that is at least partially surrounded by a wall 300 with any appropriate predetermined spacing between the support pedestals 201 and in any appropriate arrangement, such as a plurality of substantially linear rows and columns of support pedestals 201 (e.g., such as perpendicular rows and columns as shown in FIG. 1). Part of this step may in some situations include aligning (e.g., leveling) the top surfaces 220 of the support pedestals 201 via adjusting (e.g., rotating) the base and support member extensions 214, 219 relative to each other.

A plurality of interior surface tiles $102_i$ and peripheral surface tiles $102_p$ may be laid over the support pedestals 201 to create an elevated building surface 101. One or more restraint apparatuses 400, 400', 400" may be secured to the wall 300 as discussed herein (either before or after the surface tiles 102 are laid over the support structure 200) that are configured to restrict movement of the surface tiles 102 of the elevated building surface 101 in a direction away from the fixed surface 103. As discussed herein, one or more cover members (e.g., cover member 500 of FIG. 5a, such as counterflashing or the like) may be attached to the wall 300 and configured to cover or conceal the restraint apparatuses 400, 400', 400". In conjunction with the laying down of the surface tiles 102 over the support pedestals, one or more elongate restraining members (e.g., elongate restraining member 350 of FIG. 1) may be used to interconnect one or more pairs of adjacent surface tiles 102 and/or attach surface tiles 102 (the interior surface tiles 102k) to the support pedestals 201.

Figure 9:
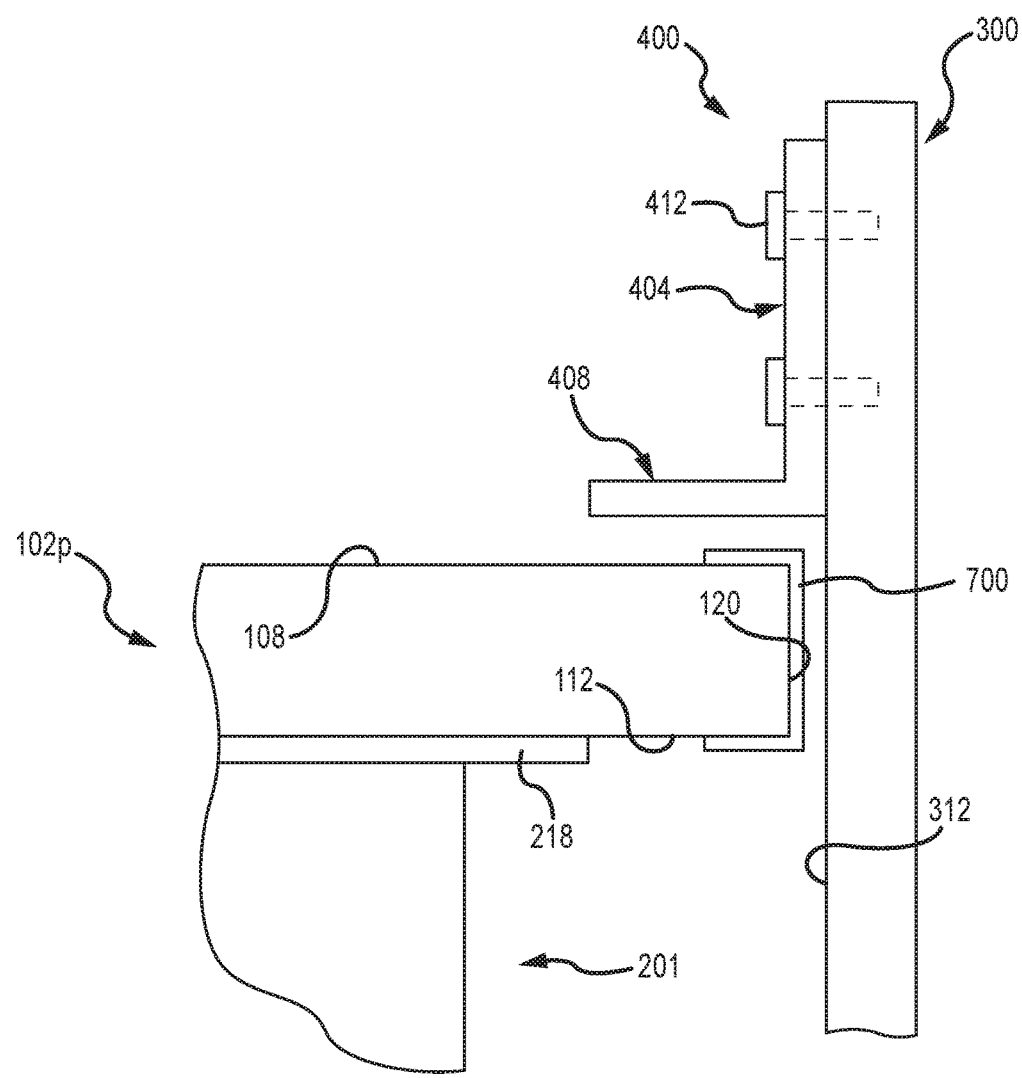
FIG. 9 is a perspective view similar to FIG. 3a but including a channel member disposed over the outer periphery of the elevated surface.

It is to be understood that the various components disclosed herein have not necessarily been drawn to scale. Furthermore, various additions and modifications can be made to the embodiments disclosed herein without departing from the scope of the present disclosure. In one arrangement, one or more channel members 700 may be wrapped around the outer periphery of the flooring surface so as to interconnect adjacent peripheral surface tiles $102_p$ (e.g., wrapped around the outer edge segments 120 of at least first and second adjacent ones of the plurality of peripheral surface tiles $102_p$). See FIG. 9. For instance, the channel member 700 may be in the form an elongated member that is disposed over a portion of two or more of the peripheral surface tiles $102_p$ (e.g., over the top surface 108 or within an opening or kerf in the outer edge segment 120) and under the bottom surface 112 of at least one of the plurality of peripheral surface tiles. The one or more channel members 700 may or may not be attached to the support structure or the wall 300. Each channel member 700 may have a cross-section that is one of a C-shape, a U-shape, or an H-shape.

Various combinations of the embodiments and arrangements disclosed herein are envisioned and encompassed within the scope of the present disclosure. While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. A building surface assembly, comprising:
   a support structure disposed on a fixed surface;
   a plurality of surface tiles disposed on the support structure, wherein each of the plurality of surface tiles includes opposite top and bottom surfaces, a plurality of corner portions and an outer edge segment between adjacent ones of the plurality of corner portions and between the top and bottom surfaces, wherein the plurality of surface tiles collectively form a flooring surface, wherein the plurality of surface tiles includes interior surface tiles and peripheral surface tiles disposed about the interior surface tiles, and wherein outer edge segments of the peripheral surface tiles collectively form an outer periphery of the flooring surface that is positionable adjacent a wall that extends from the fixed surface; and
   one or more restraint apparatuses non-movably securable to the wall and positionable adjacent the outer periphery of the flooring surface for restricting movement of at least a first of the peripheral surface tiles in a direction away from the fixed surface, wherein the bottom surface of the first peripheral surface tile is unsupported by the one or more restraint apparatuses adjacent its outer edge segment at the outer periphery of the flooring surface, wherein each restraint apparatus includes:
      a mounting portion that is securable to the wall; and
      a restraint portion positionable over a portion of at least one of the peripheral surface tiles adjacent the outer periphery, wherein the restraint portion includes a front edge and an opposite rear edge positionable adjacent the wall, wherein the mounting portion extends downwardly from the rear edge of the restraint portion towards the fixed surface.

2. The building surface assembly of claim 1, wherein the mounting portion comprises a plurality of apertures therein that are sized and positioned to receive fasteners inserted therein and into the wall to secure the restraint members to the wall.

3. The building surface assembly of claim 1, wherein the restraint portion is an elongate member that runs along the top surface of the at least one of the peripheral surface tiles adjacent the outer periphery.

4. The building surface assembly of claim 1, wherein the restraint portion is a single, unitary structure.

5. A system, comprising:
   a support structure disposed on a fixed surface;
   a wall extending generally perpendicularly from the fixed surface;
   a plurality of surface tiles disposed on the support structure, wherein each of the plurality of surface tiles includes opposite top and bottom surfaces, a plurality of corner portions and an outer edge segment between adjacent ones of the plurality of corner portions and between the top and bottom surfaces, wherein the plurality of surface tiles collectively form a flooring surface, wherein the plurality of surface tiles includes interior surface tiles and peripheral surface tiles disposed between the interior surface tiles and the wall; and
   a plurality of restraint apparatuses non-movably secured to the wall for restricting movement of the peripheral surface tiles in a direction away from the fixed surface, wherein the bottom surfaces of the plurality of peripheral surface tiles are unsupported by the plurality of restraint apparatuses adjacent their outer edge segments at the outer periphery of the flooring surface, wherein each of the plurality of restraint apparatuses includes:
      a mounting portion secured to the wall; and
      a restraint portion positioned over a portion of at least one of the peripheral surface tiles for restricting movement of the at least one peripheral surface tile in a direction away from the fixed surface, wherein the restraint portion includes a front edge and an opposite rear edge adjacent the wall, and wherein the mounting portion extends downwardly from the rear edge of the restraint portion towards the fixed surface.

6. The system of claim 5, wherein the restraint portion is positioned over the top surface of the at least one of the peripheral surface tiles.

\* \* \* \* \*